US010397781B2

United States Patent
Wimböck

(10) Patent No.: US 10,397,781 B2
(45) Date of Patent: Aug. 27, 2019

(54) METHOD AND SYSTEM FOR PERSONALIZING A SECURITY ELEMENT OF A TERMINAL

(71) Applicant: GIESECKE & DEVRIENT GMBH, München (DE)

(72) Inventor: Ulrich Wimböck, Tutzing (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 205 days.

(21) Appl. No.: 15/515,312

(22) PCT Filed: Aug. 7, 2015

(86) PCT No.: PCT/EP2015/001640
§ 371 (c)(1),
(2) Date: Mar. 29, 2017

(87) PCT Pub. No.: WO2016/050333
PCT Pub. Date: Apr. 7, 2016

(65) Prior Publication Data
US 2017/0230830 A1    Aug. 10, 2017

(30) Foreign Application Priority Data

Sep. 30, 2014  (DE) .................. 10 2014 014 561

(51) Int. Cl.
*H04L 29/06*     (2006.01)
*H04W 12/06*     (2009.01)
(Continued)

(52) U.S. Cl.
CPC ............. *H04W 12/06* (2013.01); *H04L 63/06* (2013.01); *H04L 63/083* (2013.01);
(Continued)

(58) Field of Classification Search
None
See application file for complete search history.

(56) References Cited

U.S. PATENT DOCUMENTS

2008/0260149 A1* 10/2008 Gehrmann ......... G06Q 20/3821
380/247
2011/0214172 A1* 9/2011 Hermann ............ H04L 63/0823
726/7
(Continued)

FOREIGN PATENT DOCUMENTS

EP    2448215 A1    5/2012
EP    2747466 A1    6/2014

OTHER PUBLICATIONS

German Search Report for corresponding German Application No. 102014014561.1, dated May 19, 2015.
(Continued)

*Primary Examiner* — Andrew J Steinle
(74) *Attorney, Agent, or Firm* — Workman Nydegger

(57) ABSTRACT

Provided are a method for personalizing a security element for a mobile end device for communicating via a mobile radio network as well as a corresponding system. The method comprises the following steps: supplying initialization data of an initialization entity to the security element, wherein the initialization data comprise a personalization token; supplying the personalization token from the security element to a personalization entity; checking the validity of the personalization token through the personalization entity; and after successfully checking the validity of the personalization token, supplying personalization data from the personalization entity to the security element, wherein authorization data for authenticating the security element in encrypted form are already part of the initialization data and the personalization data comprise a key for decrypting the authorization data.

12 Claims, 2 Drawing Sheets

(51) Int. Cl.
H04W 12/04 (2009.01)
H04W 12/08 (2009.01)
(52) U.S. Cl.
CPC ........ *H04L 63/0876* (2013.01); *H04L 63/166* (2013.01); *H04W 12/04* (2013.01); *H04W 12/08* (2013.01); *H04L 2463/062* (2013.01)

(56) References Cited

U.S. PATENT DOCUMENTS

| | | |
|---|---|---|
| 2012/0108205 A1 | 5/2012 | Schell et al. |
| 2013/0205134 A1 | 8/2013 | Holtmanns et al. |
| 2015/0074780 A1* | 3/2015 | Schell ................ H04L 63/0823 726/7 |

OTHER PUBLICATIONS

GSM Association, "GSMA Embedded SIM Remote Provisioning Architecture," Dec. 17, 2013, pp. 1-84, Version 1.1, URL: http://www.gsma.com/connectedliving/wp-content/uploads/2014/01/1.-GSMA-Embedded-SIM-Remote-Provisioning-Architecture-Version-1.1.pdf.

International Search Report for corresponding International PCT Application No. PCT/EP2015/001640, dated Nov. 3, 2015.

* cited by examiner

METHOD AND SYSTEM FOR PERSONALIZING A SECURITY ELEMENT OF A TERMINAL

FIELD OF THE INVENTION

This invention concerns communication via mobile radio networks in general and, in particular, methods and systems for personalizing a security element of a mobile end device for communicating via a mobile radio network.

BACKGROUND OF THE INVENTION

Communicating by means of a mobile end device, for example by means of a mobile telephone, via a mobile radio network (also designated as a PLMN [Public Land Mobile Network]) which is operated by a network operator (also designated as an MNO [Mobile Network Operator]) as a rule requires that the mobile end device is equipped with a security element, for example in form of a SIM card, for securely storing subscription authorization data ("Subscription Credentials") which uniquely identify and authenticate the user of the mobile end device vis-à-vis the mobile radio network. Such subscription authorization data individual to the security element, for example an IMSI (International Mobile Subscriber Identity) and an authentication key $K_i$, are deposited as a rule within the scope of a so-called "personalization" in the secure environment of the secure-element manufacturer on a security element.

While in the past the great majority of security elements could be simply exchanged in the form of SIM cards in a mobile end device, there exist for some time more and more security elements which are firmly installed in a mobile end device. Such a security element firmly installed in a mobile end device is known to the skilled person particularly under the term "Embedded SIM" or "Embedded UICC (eUICC)".

As already mentioned hereinabove, the personalization was hitherto effected as a rule in a secure environment at the manufacturer of the security element. In the future, this will often no longer be possible because the personalization must be effected already at the manufacturer of the security element's processor or later in the production line of the manufacturer of the mobile end device with the security element embedded therein. In this case it must be ensured, however, that the processor manufacturer or the manufacturer of the mobile end device has no or at best only a restricted access to the personalization data individual to the security element to be applied to the security element, in particular the subscription authorization data contained therein.

Therefore a demand for improved methods and apparatuses exists for personalizing a security element which is installed, preferably firmly, in an end device.

SUMMARY OF THE INVENTION

According to the first aspect of the invention a method is supplied for the personalizing a security element for an end device for communicating via a mobile radio network. The method comprises the following steps: supplying initialization data from an initialization entity to the security element, wherein the initialization data comprise a personalization token; supplying the personalization token from the security element to a personalization entity; checking the validity of the personalization token through the personalization entity; and after successfully checking the validity of the personalization token, supplying personalization data from the personalization entity to the security element, wherein the authorization data for authenticating the security element in encrypted form are already part of the initialization data and the personalization data comprise a key for decrypting the authorization data. The end device can be a mobile (or stationary) end device.

According to the invention, in a first phase initialization data having a personalization token are therefore loaded on the security element by an initialization entity. The initialization entity may be, for example, a server of the manufacturer of the security element's processor or the manufacturer of the mobile end device having a security element embedded therein. The initialization data for a batch of security elements to be personalized are substantially identical. Beside these initialization data, a valid personalization token individual to the security element is supplied to the security element. The initialization data can, for example, be parts of an operating system of the security element.

In a second phase, the security element proves according to the invention, by means of its valid personalization token vis-à-vis a personalization entity, its authorization to be allowed to download, besides the initialization data, personalization data individual to the security element of the personalization entity. Using subscription authorization data ("Subscription Credentials") such as an IMSI (International Mobile Subscriber Identity) and/or an authentication key $K_i$, the security element can authenticate itself vis-à-vis a mobile radio network. Authorization data can comprise, alternatively or additionally, an encryption key. In the present case (subscription) authorization data in encrypted form are already a part of the initialization data. The personalization data comprise a key for decrypting the authorization data already present in the security element. The personalization data can comprise further data individual to the security element.

Preferably, the method comprises, prior to the step of supplying the initialization data from the initialization entity to the security element, the further step of supplying the initialization data and a batch of valid personalization tokens from the personalization entity to the initialization entity. Such valid personalization tokens are preferably signed digitally by the personalization entity so that it can be checked whether a personalization token derives from the personalization entity.

According to the preferred embodiments of the invention, the supplying of the personalization data from the personalization entity to the security element is effected via a secure communication channel between the personalization entity and the security element.

Preferably, for establishing a secure communication channel between the personalization entity and the security element, a key individual to the security element is agreed upon between the personalization entity and the security element, with which the personalization data are secured.

According to preferred embodiments of the invention, the secure channel between the personalization entity and the security element is based on a public-key infrastructure. In these preferred embodiments of the invention the initialization data which are transferred to the security element preferably comprise a certificate of the personalization entity having a public key of the personalization entity. Preferably a TLS (Transport Layer Security) communication channel can in this way be formed between the personalization entity and the security element, wherein the personalization entity authenticates itself vis-à-vis the security element. The authentication of the security element vis-à-vis the personalization entity is effected preferably via the personalization token.

In the step of supplying the personalization token to the personalization entity, the security element preferably transfers, besides the personalization token, an identifier of the security element, for example a chip ID or eID, to the personalization entity.

According to preferred embodiments of the invention, upon initialization more than one personalization token can be supplied on the security element. The provision of further personalization tokens is advantageous in the event that the first personalization token of the personalization entity is not accepted.

Preferably the method comprises, after the step of successfully checking the validity of the personalization token, the further step of marking the personalization token on the personalization entity as invalid or already used.

According to preferred embodiments of the invention, the personalization entity can be configured to check the validity of the personalization token by means of further mechanisms to recognize and, where applicable, decline the abuse of personalization tokens.

According to the second aspect of the invention, a system is supplied for the personalizing a security element for an end device for communicating via a mobile radio network. The system comprises an initialization entity which is configured to supply initialization data to the security element, wherein the initialization data comprise a personalization token as well as a personalization entity which is configured to receive the personalization token from the security element, to check the validity of the personalization token, and to supply personalization data to the security element after successfully checking the validity of the personalization token, wherein the personalization data comprise subscription authorization data for authenticating vis-à-vis a mobile radio network or the subscription authorization data for authenticating the security element vis-à-vis the mobile radio network in encrypted form are already part of the initialization data and the personalization data comprise a key for decrypting the subscription authorization data. The end device can be a mobile (or stationary) end device.

As the skilled person will recognize, the hereinabove described preferred embodiments can be implemented advantageously both within the context of the first aspect of the invention, i.e. within the context of the method for personalizing a security element, and within the context of the second aspect of the invention, i.e. within the context of a system for personalizing a security element.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1:
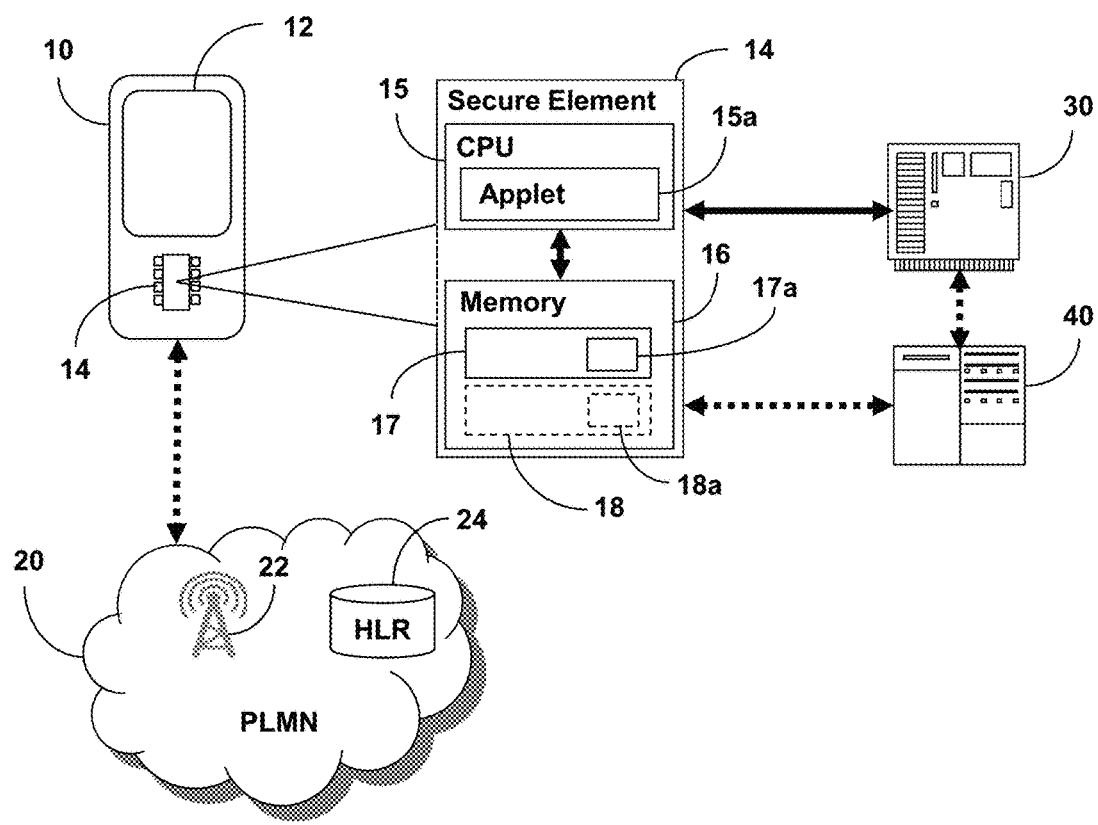
FIG. 1 a schematic representation of a system for personalizing a security element in the form of an eUICC, as part of a mobile phone for communicating via a mobile radio network, which illustrates different aspects of the present invention, and FIG. 2 a schematic representation of a preferred sequence upon personalizing the security element of FIG. 1.

FIG. 1 shows a schematic representation of the components of a system for personalizing a security element of a mobile end device and some of the communication connections between said components, which illustrates different aspects of the present invention. Although reference will be made to a "mobile" end device in the following detailed description, the skilled person will recognize that the present invention can be implemented advantageously in connection with every kind of end device that is configured for communicating via a mobile or cellular communication network, i.e. also with end devices whose location practically does not change. In other words, the herein employed attribute "mobile" relates to the ability of the end device to communicate via a mobile or cellular communication network.

An exemplary mobile end device 10 is represented in FIG. 1, comprising a security element ("Secure element") 14 for securely storing and processing data which, for example, uniquely identify the mobile end device 10 and/or its user. As indicated in FIG. 1, the mobile end device 10 is preferably a mobile telephone, a smartphone or a similar apparatus having a display 12. The skilled person will recognize, however, that the mobile end device 10 according to the present invention can likewise be implemented in the form of other apparatuses that are adapted for communicating via a mobile radio network, such as a tablet computer, a notebook, a TV system, a set-top box, a vending machine, an automobile, a surveillance camera, a sensor apparatus, and the like.

According to preferred embodiments of the invention, the security element 14 is configured as an eUICC (embedded Universal Integrated Circuit Card) having a SIM application implemented thereon, i.e. as a security element which is a permanent component of the mobile end device 10 and is employed in a mobile radio network for uniquely and securely identifying the user or subscriber and for supplying different functions and value-added services. Alternatively, the security element 14 can be configured as a UICC (Universal Integrated Circuit Card) or SIM card (Subscriber Identity Module) which is known to the skilled person as one of the currently most frequently employed forms of security element. The skilled person will recognize, however, that other kinds of security elements, which are designated as USIM, R-UIM, ISIM, and the like, depending on the generation and type of underlying mobile radio standard, are likewise embraced by the present invention.

According to further preferred embodiments of the invention, the security element 14 can be configured as a combination of hardware and software components in a trustworthy part of an operating system of a central processing unit of the mobile end device 10, which is also known to the skilled person as a secure runtime environment ("Trusted Execution Environment"; TEE). The security element 14 can then be configured for example within such a secure runtime environment of the mobile end device 10 in the form of programs running therein, so-called Trustlets®.

The mobile end device 10 is configured to communicate via the over-the-air interface with a mobile radio network 20 (also designated as a "Public Land Mobile Network" [PLMN]). For this purpose the mobile end device 10 has as a rule an antenna (not shown in FIG. 1) for sending and receiving of radio waves.

Hereinafter some preferred embodiments of the invention will be described in connection with a mobile radio network 20 according to the GSM standard "Global Standard for Mobile Communications"), which is specified in a plurality of ETSI specifications. The skilled person will recognize, however, that the present invention can also be used advantageously in connection with other mobile radio networks. Such networks comprise mobile radio networks of the third generation (3GPP), such as UMTS (Universal Mobile Telecommunications System), mobile radio networks of the fourth generation (4G), such as LTE (Long Term Evolution), and other mobile radio networks, such as CDMA, and the like.

As is known to the skilled person, a mobile radio network or PLMN constructed according to the GSM standard generally comprises a BSS ("Base Station Subsystem") which consists of a plurality of BTSs ("Base Transceiver Stations") which define respective radio cells of the PLMN and are connected to a BSC ("Base Station Controller"). Usually, the BSC is one of a plurality of BSCs which communicate with a common MSC ("Mobile Switching Center"). Frequently, a local database, which is called the VLR ("Visitor Location Register"), is part of the MSC in order to hold information available about the mobile radio subscribers who are located at the moment in the radio cells that are served by an MSC (i.e. the range covered by an MSC). The MSC supplies substantially the same functionality as a switching center in a fixed-line network (public-switched telephone network; PSTN) and is in communication with an HLR ("Home Location Register"), which is the PLMN's primary database storing information for logging in or authentication of the mobile radio subscribers. For this purpose, the HLR usually has access to an AUC ("Authentication Center"). As is known to the skilled person, the communication connections between the hereinabove described components of a PLMN can be based on proprietary and/or open standards. The employed protocols can be for example SS7- or IP-based. How the network components are configured as separate or combined units and how the interfaces between said components are configured is up to the MNO, so that the hereinabove description is merely to be understood as exemplary.

The skilled person will recognize that, although the hereinabove described functional units of a conventional mobile radio network according to the GSM standard can have other names in other or future mobile radio standards, the basic principles are substantially the same and they are hence likewise embraced by the invention. For clarity's sake, in the schematic representation of FIG. 1 are shown, of the hereinabove described components of a mobile radio network, merely the following: an exemplary BTS 22 as well as a HLR 24 for the mobile radio network 20.

As indicated by the enlarged view of the security element 14 in FIG. 1, the security element 14 preferably comprises a central processor or a central processing unit (CPU) 15. Preferably the processor 15 is equipped such that applications on the processor 15 can be executed, such as a personalization application 15a (designated "an applet" in the FIG. 1) which supplies preferably at least some of the features for the personalizing of the security element 14, as this is described hereinafter in connection with FIG. 2 in detail.

The security element 14 preferably further comprises a memory unit 16 which is preferably implemented as a non-volatile, rewritable memory unit, e.g. in the form of a flash memory. According to the invention, in a first step initialization data 17 from an initialization instance 30 having a personalization token 17a are deposited on this memory unit 16 and in a second step personalization data 18 having (subscription) authorization data ("Subscription Credentials") 18a are deposited by a personalization entity 40, as this is described hereinafter in detail in connection with FIG. 2. Preferably, the personalization data 18 and particularly the subscription authorization data enable the security element 14 and the mobile end device 10 to log into the mobile radio network 20 and communicate thereover.

Figure 2:
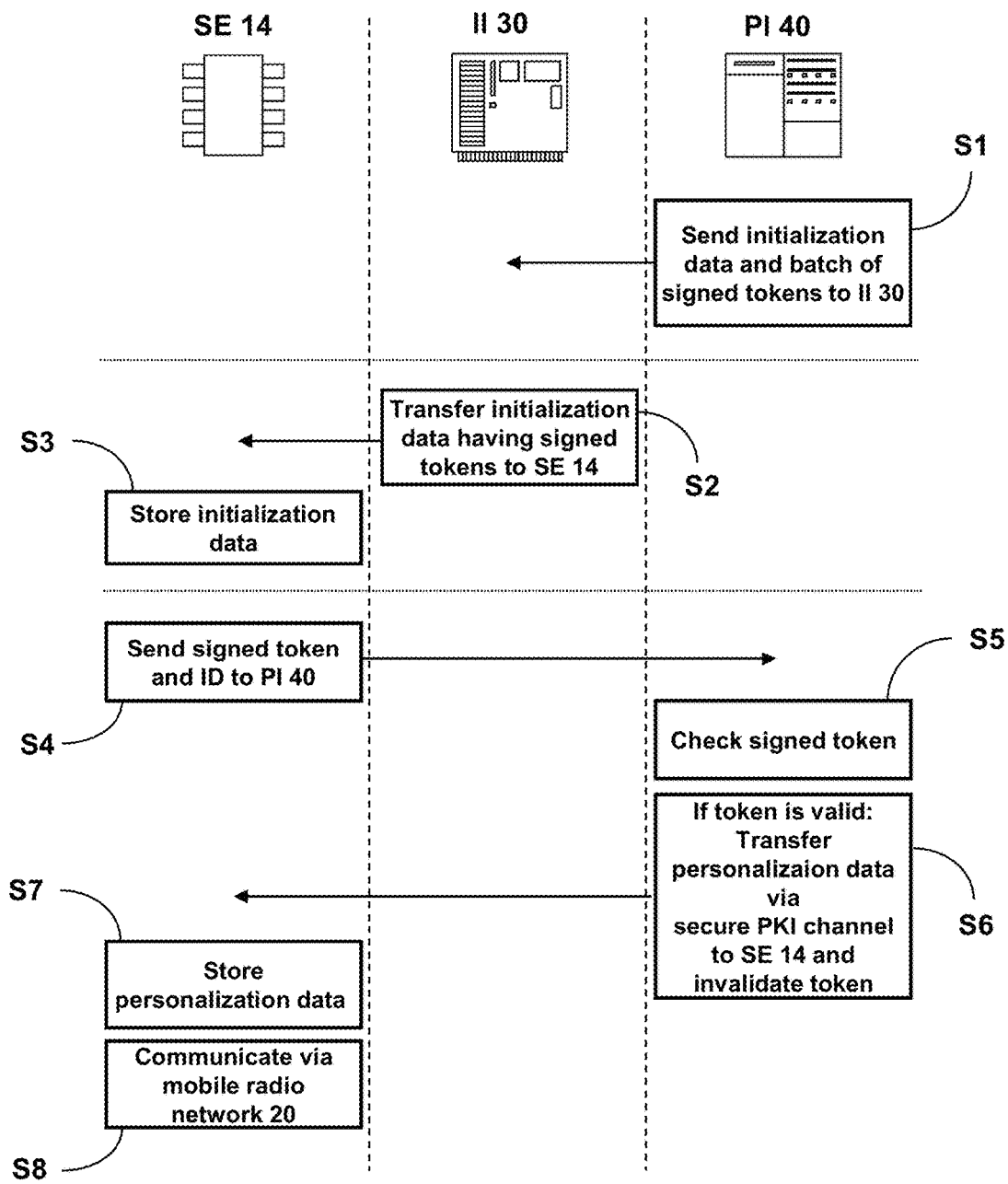

FIG. 2 shows a preferred sequence, according to the invention, in the context of the personalization of the security element 14 of FIG. 1. In a first step S1 of FIG. 2, initialization data 17 as well as a batch of signed personalization tokens 17a are supplied to an initialization entity 30 by a personalization entity 40. The initialization data 17 may, for example, be parts of an operating system to be implemented on the security element 14, wherein the initialization data 17 can be identical for all security elements to be initialized. The initialization entity 30 may be, for example, a server of the manufacturer of the security element's processor or the manufacturer of the mobile end device having the security element embedded therein. The batch of signed personalization tokens may be a list of individual random numbers and the digital signatures of these random numbers.

In step S2 of FIG. 2, in a first phase of the inventive method for personalizing the security element 14, the initialization data 17 are supplied or transferred together with a signed personalization token 17a from the initialization entity 30 to the security element 14. It is conceivable according to the invention that the security element 14 is present as an individual chip, a chip module, a SIM or the like. In step S3 of FIG. 2, the initialization data 17 received from the initialization entity 30 including the personalization token 17a are put in the security element 14, preferably in its memory 16 shown in FIG. 1.

In a second phase of the inventive method for personalizing the security element 14, in step S4 of FIG. 2 the security element 14 sends the personalization token 17a, preferably together with an identifier ID of the security element 14, e.g. a chip ID, to the personalization entity 40.

In step S5 of FIG. 2, the personalization entity 40 checks the validity of the personalization token 17a received by the security element 14. According to preferred embodiments of the invention, such a check can take place by checking by means of a database of the personalization entity 40 whether the personalization token 17a received from the security element 14 has been output by the personalization entity 40 (for example in step S1 of FIG. 2) and whether this personalization token 17a has not already been employed for the downloading of personalization data 18, i.e. whether the personalization token 17a is still valid.

If in step S5 of FIG. 2 the check is successful, i.e. if the personalization entity 40 ascertains that the personalization token 17a received from the security element 14 is valid, in step S6 of FIG. 2 personalization data individual to the security element are supplied or transferred via a secure communication channel 18 from the personalization entity 40 to the security element 14, where these are stored in step S7 by FIG. 2. The personalization data 18 supplied by the personalization entity 40 to the security element 14 could contain subscription authorization data individual to the security element ("Subscription Credentials") 18a, such as an IMSI (International Mobile Subscriber Identity) and/or an authentication key $K_i$, with which in step S8 the security element 14 can log on to the mobile radio network 20 and communicate thereover.

In the present case subscription authorization data 18a in encrypted form are already a part of the initialization data 17. In this case, the personalization data 18 comprise substantially merely a key for decrypting the subscription authorization data 18a already present in the security element 14.

According to preferred embodiments of the invention, after the successful check of the personalization token 17a received by the security element 14, said personalization token can be marked as invalid or already employed in a database of the personalization entity 40. In connection with the personalization token 17a received by the security element 14, the identifier ID of the security element 14 can further be stored in the database of the personalization entity 40 so that the personalization entity 40 has information items about which security elements have already been supplied with personalization data.

According to preferred embodiments of the invention, the supplying or transferring of the personalization data 18 from the personalization entity 40 to the security element 14 is effected via a secure communication channel between the personalization entity 40 and the security element 14. Physically, such a channel can be configured between the personalization entity 40 and the security element 14, for example at least partly by a Wi-Fi network, e.g. in a shop in which a customer acquires the mobile end device 10. As this is indicated in FIG. 1 by the arrows, it is likewise conceivable according to the invention that the personalization entity 40 communicates with the security element 14/mobile end devices 10 via the initialization entity 30.

Preferably, for establishing a secure communication channel between the personalization entity 40 and the security element 14, a key individual to the security element is agreed upon between the personalization entity 40 and the security element 14 with which the personalization data 18 are secured. According to preferred embodiments of the invention, the secure channel between the personalization entity 40 and the security element 14 is based on a public-key infrastructure. In these preferred embodiments the initialization data 17 which are transferred to the security element 14 preferably comprise a certificate of the personalization entity 40 having a public key of the personalization entity 40. Preferably a TLS (Transport Layer Security) communication channel can in this way be configured between the personalization entity 40 and the security element 14, wherein the personalization entity 40 authenticates itself vis-à-vis the security element 14. Here, a session key which cannot be recomputed by the initialization entity 30 is agreed on between the security element 14 and the personalization entity. The authentication of the security element 14 vis-à-vis the personalization entity 40 is effected preferably via the personalization token 17a.

According to preferred embodiments of the invention, the personalization entity 40 is configured to check the validity of the personalization token 17a by means of further mechanisms to recognize and, where applicable, decline the abuse of personalization tokens. In this connection it is conceivable that the initialization entity 30 (preferably the manufacturer of the security element 14) must deliver information items to the personalization entity 40 which personalization token has been loaded onto which security element 14 identified by its identifier. Further, mechanisms can be provided for tracking personalization tokens. In this case, the path of the mobile end device in which the security element 14 is installed can be tracked. It can be provided that the employment of a personalization token is possible only within a certain time window as of the supplying of a personalization token.

The invention claimed is:

1. A method for personalizing a hardware security element for an end device for communicating via a mobile radio network, wherein the method comprises the following steps:

supplying initialization data and a batch of personalization tokens from a personalization computing system to an initialization computing system;

supplying the initialization data from the initialization computing system to the security element, wherein the initialization data comprises at least one of the batch of personalization tokens;

supplying the at least one of the batch of personalization tokens from the security element to a personalization computing system;

checking the validity of the at least one of the batch of personalization tokens through the personalization computing system; and after successfully checking the validity of the at least one of the batch of personalization tokens, supplying personalization data from the personalization computing system to the security element;

wherein authorization data for authenticating the security element in encrypted form are already part of the initialization data and the personalization data comprise a key for decrypting the authorization data.

2. The method according to claim 1, wherein the personalization tokens are digitally signed by the personalization computing system.

3. The method according to claim 1, wherein the supplying of the personalization data from the personalization computing system to the security element is effected via a secure communication channel between the personalization computing system and the security element.

4. The method according to claim 3, wherein for establishing a secure communication channel between the personalization computing system and the security element, a key individual to the security element is agreed upon between the personalization computing system and the security element with which the personalization data are secured.

5. The method according to claim 3, wherein the secure communication channel between the personalization computing system and the security element is based on a public-key infrastructure and the initialization data which are transferred to the security element comprise a certificate of the personalization computing system having a public key of the personalization entity.

6. The method according to claim 5, wherein a TLS communication channel is formed between the personalization computing system and the security element.

7. The method according to claim 1, wherein the security element in the step of supplying the at least one of the batch of personalization tokens to the personalization computing system, transfers, besides the at least one of the batch of personalization tokens, an identifier of the security element to the personalization computing system.

8. The method according to claim 1, wherein more than one of the batch of personalization tokens is supplied on the security element.

9. The method according to claim 1, wherein the method comprises, after the step of successfully checking the validity of the at least one of the batch of personalization tokens, the further step of marking the at least one of the batch of personalization tokens on the personalization computing system as invalid.

10. The method according to claim 1, wherein the personalization computing system is configured to check the validity of the at least one of the batch of personalization tokens by means of further mechanisms.

11. A system for personalizing a hardware security element for an end device for communicating via a mobile radio network, comprising:

a personalization computing system which is configured to supply initialization data and a batch of personalization tokens to an initialization computing entity; and the initialization computing system which is configured to supply the initialization data to the security element, wherein the initialization data comprises at least one of the batch of personalization tokens;

wherein the personalization computing system is further configured to receive the at least one of the batch of personalization tokens from the security element, to check the validity of the at least one of the batch of personalization tokens, and, after successfully checking the validity of the at least one of the batch of personalization tokens, to supply personalization data to the security element, wherein the authorization data for authenticating the security element in encrypted form are already part of the initialization data, and the personalization data comprises a key for decrypting the authorization data.

12. The system according to claim 11, wherein the authorization data are provided as subscription authorization data for authenticating the security element vis-à-vis the mobile radio network.

\* \* \* \* \*